United States Patent [19]
Jenkins

[11] Patent Number: 4,993,066
[45] Date of Patent: Feb. 12, 1991

[54] METHOD FOR TELEVISION SCRAMBLING

[76] Inventor: Henry H. Jenkins, 220 N. Smith Ave., Corona, Calif. 91720

[21] Appl. No.: 19,301

[22] Filed: Feb. 26, 1987

[51] Int. Cl.$^5$ .......................................... H04N 7/167
[52] U.S. Cl. ...................................... 380/16; 358/349
[58] Field of Search ..................... 380/16, 20; 358/349

[56] References Cited

U.S. PATENT DOCUMENTS

| | | | |
|---|---|---|---|
| 2,817,824 | 12/1957 | Albright | 380/16 |
| 3,274,333 | 9/1966 | Shanahan | 380/16 |
| 3,531,582 | 9/1970 | Walker | 380/16 |
| 4,025,948 | 5/1977 | Loshin | 380/16 |
| 4,471,379 | 9/1984 | Stephens | 380/16 |
| 4,599,647 | 7/1986 | George et al. | 380/20 |
| 4,623,919 | 11/1986 | Welch | 380/6 |
| 4,663,664 | 5/1987 | Ragan et al. | 380/16 |
| 4,696,034 | 9/1987 | Wiedemer | 380/16 |

*Primary Examiner*—Linda J. Wallace
*Attorney, Agent, or Firm*—Woodling, Krost & Rust

[57] ABSTRACT

A method and device for inexpensively and efficiently controlling the distribution of pay-per-access information services is disclosed including varying scrambling methods and user exchangeable cards.

9 Claims, 2 Drawing Sheets

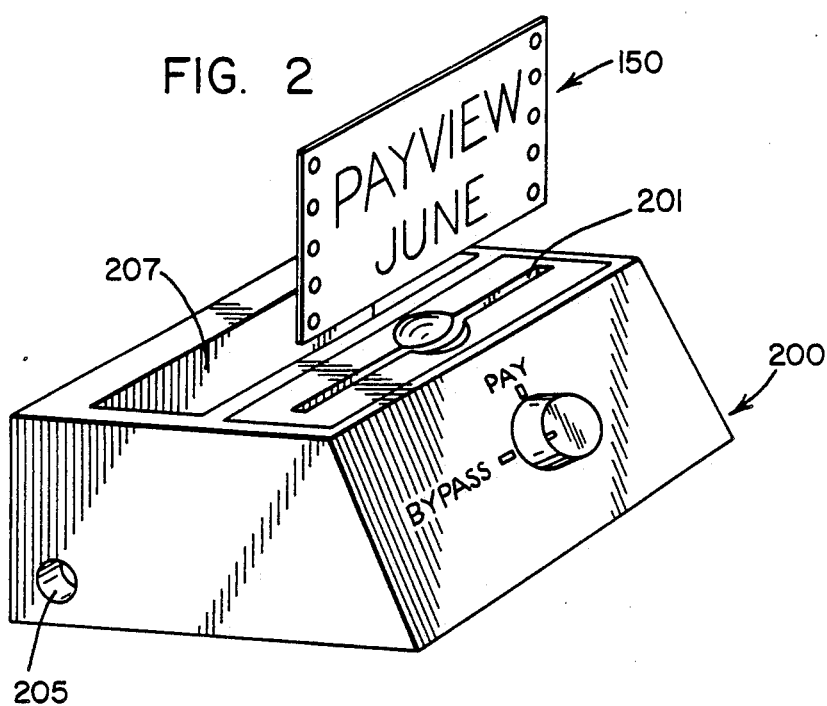
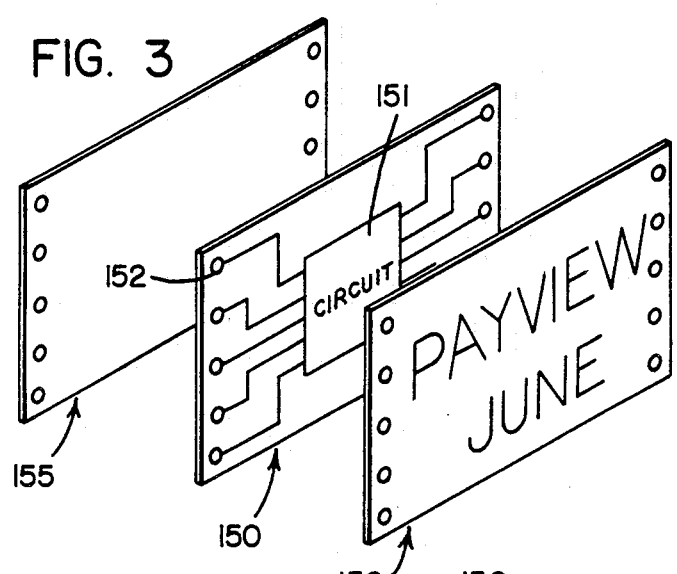
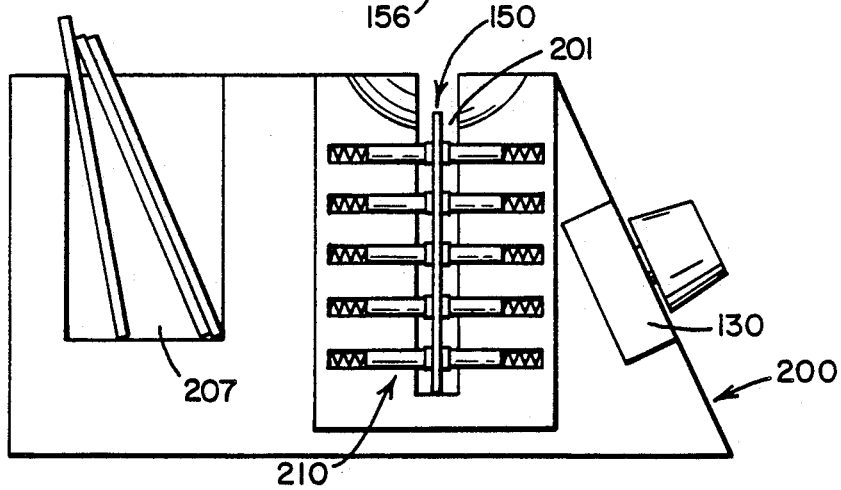

METHOD FOR TELEVISION SCRAMBLING

FIELD OF THE INVENTION

This invention relates to the transmission/reception of controlled access information, in particular pay-per-view scrambled television shows.

BACKGROUND OF THE INVENTION

A recent development in our country has been the rapid growth of the utilization of controlled access information—more especially cable and satellite scrambling television. Typically the controlled access information is transmitted in a scrambled form with the access thereto dependent upon the unscrambling of the signal at the point of reception. Currently this unscrambling occurs in an expensive digitally controlled decoder such as the M/A-Com Video Cipher II or the familiar cable black box. There is, needless to say, considerable consumer resistance to the cost of decoding the scrambled signals. However with the need to constantly vary the scrambling of the signals to avoid privateers a decoding system less expensive would not suffice: If a scrambling system is easy to break it will be.

The present invention is directed at a way of reducing the cost of transmission of the scrambled signals while increasing the security of the overall distribution network.

SUMMARY OF THE INVENTION

It is the principal object of the invention to reduce the cost while increasing the security of secured signal reception.

It is another object of the invention to reduce the economic advantages to illicitly decoding scrambled signals.

It is a further object of the invention to reduce the market for unauthorized decoding units.

Other objects and a more complete understanding of the invention may be had by referred to the following specification and drawings in which:

DESCRIPTION OF THE DRAWINGS

FIG. 2 is a perspective view of a decoding card with accompanying input/output box;

FIG. 3 is an open perspective view of the decoding card of FIG. 2; and

FIG. 4 is a cut-away cross-sectional view of the input/output box of FIG. 2.

DESCRIPTION OF THE PREFERRED EMBODIMENT

Figure 1:
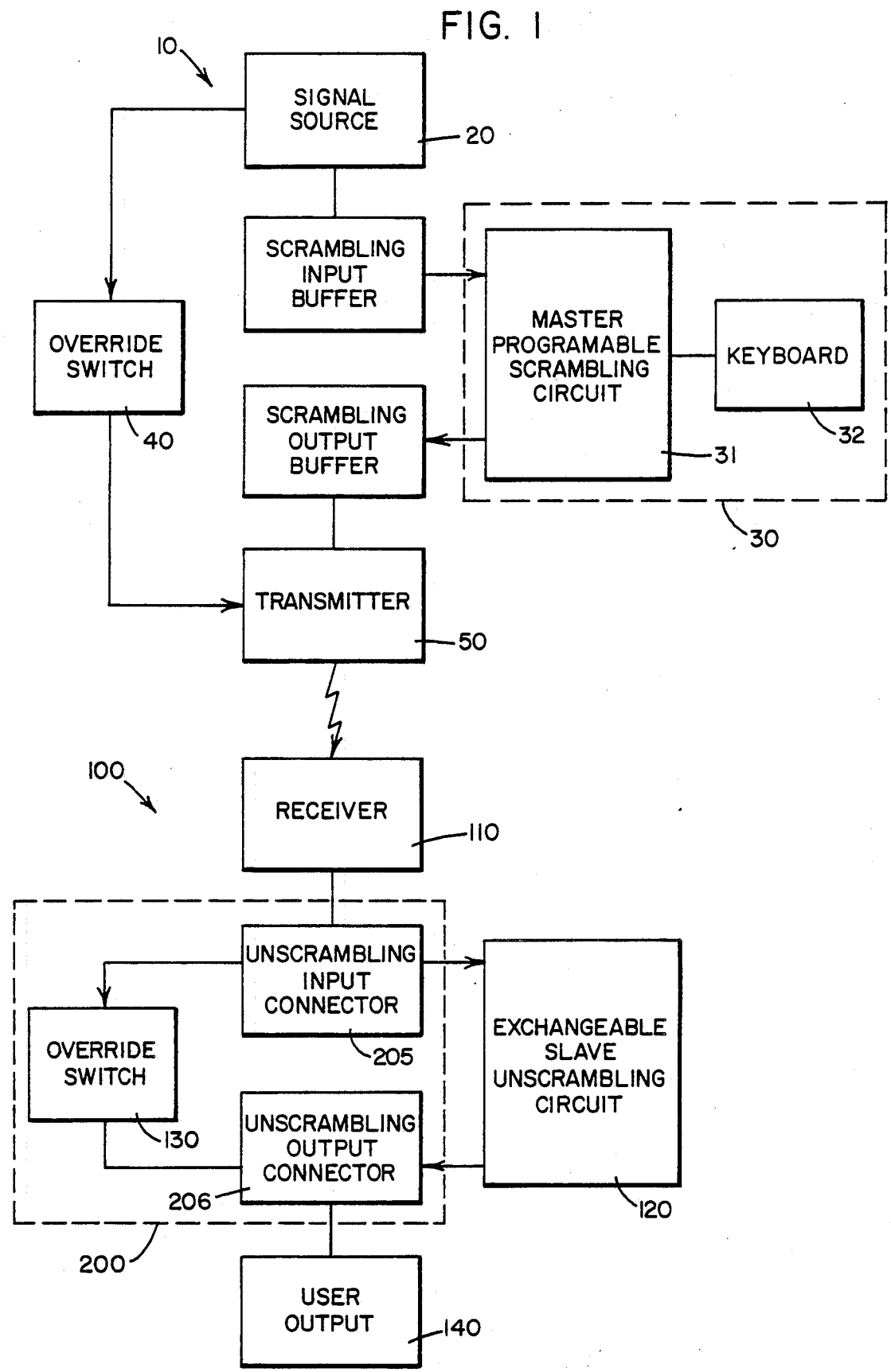
FIG. 1 is a block diagram of a transmission/reception circuit incorporating the invention.

An exemplary embodiment of the invention of this application is shown in block diagram in FIG. 1. This embodiment includes a transmission circuit 10 and a reception circuit 100 with over the air or over wire signal connections therebetween.

The transmission circuit 10 incorporates a signal source 20, a scrambling circuit 30, an override switch 40 and a transmitter 50.

The signal source 20 and transmitter 50 are standard purchase items within the confines of the desired nature of the transmission. For example with a television system the signal source 20 would normally be a video tape recorder or television camera and the transmitter 50 would be a standard television signal transmitter (all with accompanying audio channels). The override switch 40 is similarly a standard item selectively interconnecting the signal source 20 with the transmitter 50 for direct unmodified signal passage therebetween.

The invention of this application really begins with the scrambling circuit 30. In the normal secured signal transmission process a single scrambling circuit is inserted into the signal path between a signal source and the transmitter. This signal scrambling circuit modifies the signal in accord with predesigned parameters so as to render the signal unusable upon reception by a receiver not containing a corresponding decoding circuit. For example a simple modification of a television signal the normal scrambling circuit would remove the horizontal sync pulse (early cable television). For example a complex modification of a television signal the normal scrambling circuit would encode the signal with modifications derived from some sort of frequency scan and in addition include in the signal an operational code for the activation of a specific receiver (the Video-Cipher II system). In virtually every instance of normal scrambling the same basic method of coding is utilized. It is therefor inevitable that reverse engineered black market decoders will soon appear prewired to avoid the need for any actuation to decode a scrambled signal. The more expensive and complex a coding circuit is, the greater the economic incentive for someone to break into it. It comes as no surprise therefor that black market video-cipher circuits were available within weeks of the introduction of this sophisticated system. The entity responsible for the signal transmission must track down these black market decoders—thus greatly dissipating its marketing efforts and economic return. The normal system by utilizing set patterns of scrambling carries the seeds of its own problems.

In the invention of this application a master programmable scrambling circuit 31 is utilized. The master programmable scrambling circuit 31 includes a number of differing coding techniques, both active and passive. A particular technique or combination of techniques can be quickly selected and implemented at will via a programming keyboard 32. The master scrambling circuit 31 therefor is able to put out a wide variety of scrambled signals. Typical coding techniques would include signal emphasis/deemphasis, voltage spikes, sync removal, or frequency shifts. In practice any method of coding, active or passive, can be utilized that introduces some kind of objectionable interference or distortion into the signal path. In contrast with normal scrambling the number of differing techniques is more important to the invention than the sophistication of any particular one technique. The reason for this will be later explained.

To include the wide variety of coding capabilities in the master scrambling circuit would be expensive. However, since only one master scrambling circuit is necessary per system this cost is acceptable. Note that while a single scrambling circuit 31 is disclosed, such system could include a series of interchangeable individual units—each with a single coding system.

The signal as coded by the master scrambling circuit 31 is transmitted via the transmitter 50 for reception by the reception circuit 100.

The reception circuit 100 incorporates a receiver 110, an unscrambling circuit 120, an override switch 130 and a user output 140.

As with the transmission circuit 10 certain items, namely the receiver 110, the override switch 130 and the user output 140, are standard purchase items. For example with a television system the receiver 110 would be the electronics of and the user output 140 the video screen of an integral television set (again with accompanying audio channels). The override switch 130 is again a standard item selectively interconnecting the receiver 110 to the user output 140 for direct unmodified signal passage therebetween.

In the invention of this application an exchangeable slave unscrambling circuit 120 is utilized. This unscrambling circuit 120 is for example included into user exchangeable plastic cards 150 about the size of a credit card. As shown in FIG. 3 each plastic card 150 contains an electronic circuit 151 with accompanying electronic contacts 152 sandwiched between two outer layers 155, 156. The electronic circuit 151 provides the key for the unscrambling circuit 120, carefully chosen to decode a particular type of signal from the scrambling circuit 31. Since the scrambling circuit 31 can put out a wide variety of scrambled signals there is correspondingly a significant number of user exchangeable circuit cards 150, each card incorporating an electronic circuit 151 for decoding one particular scrambled signal. The plastic card 150 is incorporated into the reception circuitry 100 via its insertion into a slot 201 in a decoding box 200 located at the point of reception.

The decoding box 200 is wired in series with the receiver 110 and user output 140. The decoding box includes an input connector 205 (which could be antenna in), an output connector 206 (which could be television out), the override switch 130 and a slot 207 for storage of varying plastic unscrambling cards 150.

When any particular unscrambling card 150 is inserted into the slot 201 in the decoding box 200, a series of spring loaded conductive fingers 210 make electrical connection with the series of electronic contacts 152 on such unscrambling card 150. This connection has the effect of including the electronic circuit 151 on the card 150 into the reception circuit 100. Note that while a physical electrical connection of fingers to contacts is shown, in fact any type of interconnection could be utilized to associate the circuits 151, 100. For example induction coils could be used. Induction coils would have the advantages of freedom from wear, dirt or contaminant problems as well as making any job of reverse engineering more difficult. There is no requirement that the numbers of fingers, inductors or contacts on a particular box always watch the number on a particular card to be used with such box. Indeed having the numbers different would be preferable, (increased difficulty of reverse engineering—minimual wear on fingers, contacts, et al.). It is only important that at a given time the proper circuit in the card be matched with the associated circuit in the box—i.e. a particular decoding system be created. By merely removing one card 150 and replacing it with another, the entire decoding characteristics of the reception circuit 100 can be completely changed in an instant.

In the simplest systems each card 150 would contain the entire decoding circuit, with even a small battery to power active electronics if needed. One could even have only an antenna input to and television out from the card (two contacts) with the entire circuitry for the device on the card. The associated decoding boxes 200 would contain only electronic contacts. Even the override switch could be deleted by utilizing a blank straight signal pass through card 150 in its stead.

In the more complex systems, the decoding box 200 would also contain electronic circuitry with an accompanying power source (Preferably a battery to avoid U.L. entanglements). The card 150 would contain circuitry that cooperated with the electronic circuitry in the decoding box 200 so as to produce a synergetic result (and again possibly its own battery). For example: resistors on the card could tune the electronic circuits in the box. The card could also contain part of a complementary electronic decoding circuit—a push pull amplifier for example.

In the very complex systems the decoding box 200 and card would each contain various parts of sophisticated electronic circuits, all of which would be utilized in a certain arrangement to provide decoding. Each month the card part of the circuitry would be varied to produce a differing arrangement. The cards could also have a set value ($50.00) of usage for the decoded programs with the time of usage being automatically deducted from the set value. This would produce a system wherein possession of the decoding card having a value would be required for reception of a program.

In practice once each month, or even for a given program, the master scrambling circuit 31 would be set for a particular type of coding at this same time the user would insert an unscrambling card 150 incorporating a complementary decoding circuit into the decoding box 200, the user having previously purchased the card 150 at a local card distribution outlet. Since the coding and card 150 match, the user can receive the signal from the transmitter. If, however, a wrong card 150 was utilized, such reception would not occur. Due to the incorporation of at least some of the decoding circuitry into the card, no amount of tinkering with a decoding box would enable a user to override the scrambling. The possession of a decoding box 200 therefor does not advantage anyone—the decoding boxes 200 by themselves are sufficiently worthless for unscrambling a signal that such boxes could even be given away without significant risk. Even if an individual with a decoding box 200 did come into possession of a valid card 150, the damage would be minimal—the card 150 would only be valid for a certain short duration of time. Then a new card 150 would take over.

In practice there would be systems incorporating the invention scattered about the world. Each system would have a central varying scrambling circuit 31. Each system would purchase varying cards 150 in bulk incorporating unscrambling circuits. These cards 150 would at the time of purchase or soon thereafter have front and back designs 156, 155 placed thereon. The front design 156 would normally be a system, program and price identification with instructions of use on the back 155. Shortly before a particular program incorporating a particular scrambling technique is transmitted, the card 150 corresponding to such program is shipped to a number of local retail outlets (7—11, K-Mart, Sears, etc.) for retail sale and to prepaid, customers directly. Upon acquisition of the card 150 the customer utilizes it at the appropriate time to receive the particular program. The customer then throws the card away.

In order to "beat" the system a black marketer must know when a certain particular scrambler technique is going to be utilized by a particular system, he must have access to the unscrambling cards 150 for such system and/or the facilities to duplicate them in volume, and he must have an ongoing volume distribution channel. The usage of decoding cards 150 therefor remove most if not all of the economic incentive to "beat" the system. Note that even the knowledge of the full range of available scrambling techniques does one no good if one does not know which combination of techniques would be utilized at any given time in a given area. In addition since volume distribution is easy to trace, even black marketeers who did get going could be stopped.

Although the invention has been described in its preferred form with a certain degree of particularity, it is to be understood that numerous changes may be made without departing from the invention a hereinafter claimed.

What is claimed is:

1. In a device incorporating a scrambling transmitter and a receiver incorporating an unscrambling circuit having key elements for secured passage of a signal, the improvement of means to incorporate more than one scrambling technique into the scrambling transmitter and means for the selective interchange of the key elements of the unscrambling circuit so as to allow selective reception of the signals incorporating the differing scrambling techniques.

2. The improved device of claim 1 characterized in that said means for the selective interchange of the key elements of the unscrambling circuit includes means to interchange substantially the entire unscrambling circuit.

3. The improved device of claim 1 characterized in that the key elements of the unscrambling circuit are on a card, and said card being interchangeable with other cards.

4. In a device incorporating a scrambling transmitter and a receiver incorporating an unscrambling circuit having key elements for secured passage of a signal, the improvements of means for the transmitter to selectively utilize more than one scrambling technique, each scrambling technique having certain coding characteristics, a certain scrambling technique being utilized by the transmitter at a given point in time, the key elements of the unscrambling circuit of the receiver being on a card, said card being one of a multitude of cards each cooperating with the receiver to produce an unscrambling characteristic corresponding to a given scrambling technique of the transmitter, and each said card being selectively connectable to the receiver to produce a certain unscrambling technique so as to allow the secured passage of the signal via a matching of the certain unscrambling technique of the receiver to the certain scrambling technique of the transmitter.

5. An improved signal transfer device for a signal, the device comprising a scrambling means for introducing some kind of objectionable interference or distortion selectively into the signal according to one of a multiple of differing scrambling techniques, said signal containing no authorization or unscrambling coding information, a transmitter means, said transmitter means transmitting the signal from said scrambling means, a receiver, said receiver receiving the signal from said transmitter means, an unscrambling means for removing the objectionable interference or distortion from the signal by acting on the signal from said receiver, and said unscrambling means being selectively modifiable to unscramble a signal scrambled by any of said multiple of differing scrambling techniques so as to be compatible with said scrambling means and descramble the signal received by said receiver.

6. The improved device of claim 5 wherein substantially all of said unscrambling means is on a replaceable card with the replacement of said card selectively modifying said unscrambling means to correspond to the particular scrambling technique being utilized by said scrambling means.

7. The improved device of claim 5 characterized in that the signal does not include any data relative to the objectionable interference or distortion in the signal for use by said unscrambling means.

8. An improved signal transfer device for a signal, the device comprising a scrambling means for introducing some kind of objectionable interference or distortion into the signal selectively according to a particular one of a multiple of differing scrambling techniques, a transmitter means, said transmitter means transmitting the signal from said scrambling means, a receiver, said receiver receiving the signal from said transmitting means, an unscrambling means for removing the objectionable interference or distortion from the signal by acting on the signal from said receiver, and said unscrambling means being substantially replaceable with differing unscrambling circuits as appropriate to unscramble the particular one of a multiple of differing scrambling techniques selected for said scrambling means so as to be compatible with said scrambling means to remove the objectionable interference or distortion from the signal from the receiver.

9. The improved device of claim 8 characterized in that said unscrambling means is substantially entirely on a user replaceable card.

* * * * *

US004993066C1

(12) REEXAMINATION CERTIFICATE (4314th)

United States Patent
Jenkins

(10) Number: US 4,993,066 C1
(45) Certificate Issued: Apr. 24, 2001

(54) METHOD FOR TELEVISION SCRAMBLING

(75) Inventor: Henry H. Jenkins, Corona, CA (US)

(73) Assignee: TechSearch, L.L.C., Northbrook, IL (US)

Reexamination Request:
No. 90/005,441, Aug. 2, 1999

Reexamination Certificate for:
Patent No.: 4,993,066
Issued: Feb. 12, 1991
Appl. No.: 07/019,301
Filed: Feb. 26, 1987

(51) Int. Cl.[7] .................................................. H04N 7/167

(52) U.S. Cl. .............................. 380/227; 725/26; 725/31; 380/210

(58) Field of Search .................................. 380/227, 228, 380/210, 28, 222, 223

(56) References Cited

U.S. PATENT DOCUMENTS

| 3,736,368 | | 5/1973 | Vogelman et al. | 380/16 |
| 3,736,369 | | 5/1973 | Vogelman et al. | 380/16 |
| 3,885,089 | | 5/1975 | Callais et al. | 380/13 |
| 4,322,745 | * | 3/1982 | Saeki et al. | 380/224 |
| 4,527,195 | * | 7/1985 | Cheung | 380/222 |
| 4,595,950 | | 6/1986 | Lofberg | 380/5 |
| 4,716,588 | * | 12/1987 | Thompson et al. | 380/242 |
| 4,868,376 | | 9/1989 | Lessin et al. | 235/492 |
| 5,144,663 | | 9/1992 | Kudelski et al. | 380/16 |

FOREIGN PATENT DOCUMENTS 2 132 860    7/1984  (GB) .

* cited by examiner

*Primary Examiner*—Gilberto Barrón, Jr.

(57) ABSTRACT

A method and device for inexpensively and efficiently controlling the distribution of pay-per-access information services is disclosed including varying scrambling methods and user exchangeable cards.

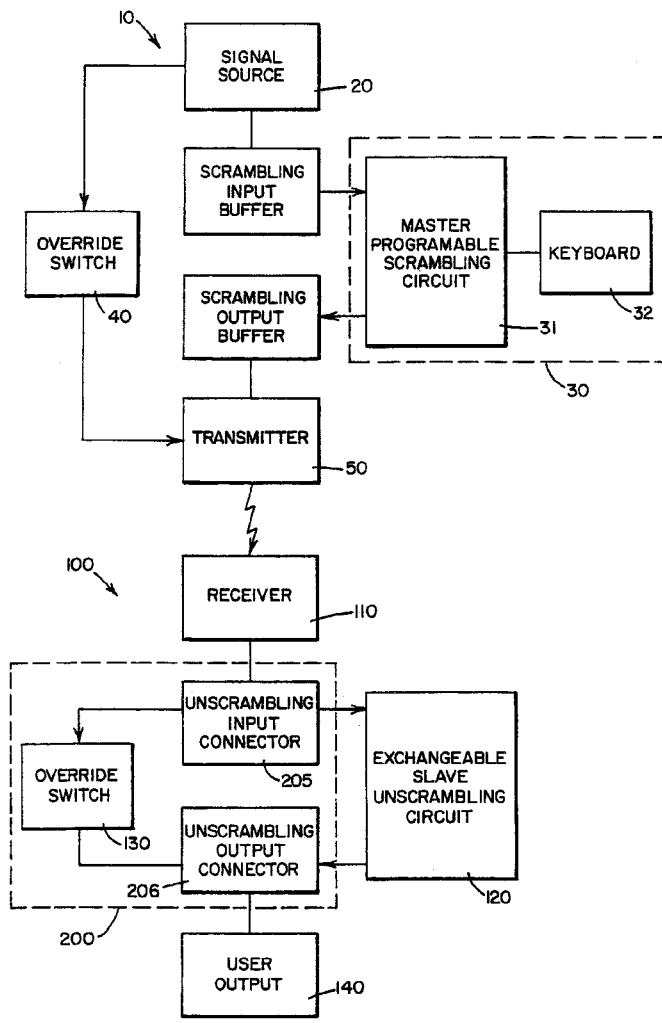

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6 and 9 is confirmed.

Claims 1, 2, 4, 5, 7 and 8 are cancelled.

Claim 3 is determined to be patentable as amended.

New claims 10 –16 are added and determined to be patentable.

3. The improved device of claim [1] *2* characterized in that the key elements of the unscrambling circuit are on a card, and said card being interchangeable with other cards.

*10. The improved device of claim 1 characterized in that the key elements of the unscrambling circuit are on a card and include the majority of the unscrambling circuit, and said card being interchangeable with other cards.*

*11. The improved device of claim 1 characterized in that the key elements of the unscrambling circuit are on a card and include the essential portion of the unscrambling circuit, and said card being interchangeable with other cards.*

*12. The device as claimed in any one of claims 10 or 11 wherein said card carries substantially all of said key elements of said unscrambling circuit.*

*13. The device as claimed in any one of claim 6 or 9 wherein said unscrambling means includes key elements and the card carries substantially all of the key elements of said unscrambling means.*

*14. The device as claimed in any one of claims 3, 6, 9, 10 or 11 wherein said receiver and said card contain electronic contacts for coupling said receiver to said card and said receiver has a different number of said electronic contacts than said card.*

*15. The device as claimed in any one of claims 3, 6, 9, 10 or 11 wherein:*

*said signal is received in scrambled form by the receiver and unscrambled at said receiver by use of electronic circuitry;*

*wherein active electronic components are contained within said card to cooperate with said electronic circuitry; and*

*wherein interchanging a card with another card causes a differing arrangement of said electronic circuitry.*

*16. The device as claimed in amy one of claims 3, 6, 9, 10 or 11 wherein a card describes a particular one of the scrambling techniques.*

* * * * *